May 22, 1928.

A. B. CLISSON ET AL

GARMENT AND LAUNDRY PRESS

Filed Aug. 7, 1922     5 Sheets-Sheet 1

1,671,064

INVENTORS

BY

ATTORNEYS

May 22, 1928.

A. B. CLISSON ET AL 1,671,064

GARMENT AND LAUNDRY PRESS

Filed Aug. 7, 1922

Albert B. Clisson
and
Philip N. Braun.
INVENTORS.

BY

Parsons & Riddell
ATTORNEYS.

May 22, 1928.
A. B. CLISSON ET AL
1,671,064
GARMENT AND LAUNDRY PRESS
Filed Aug. 7, 1922
5 Sheets-Sheet 3
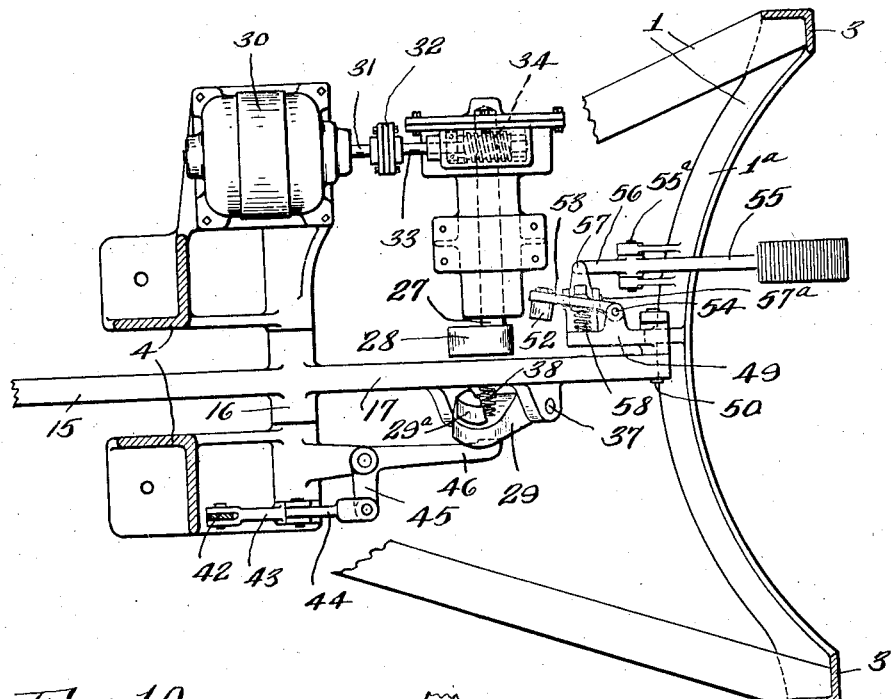
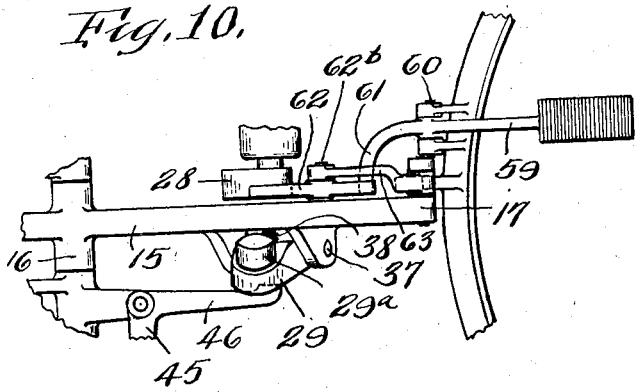
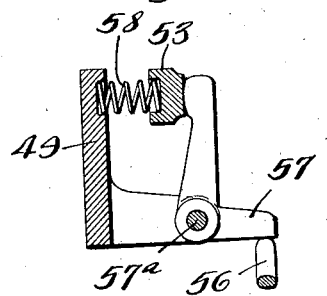

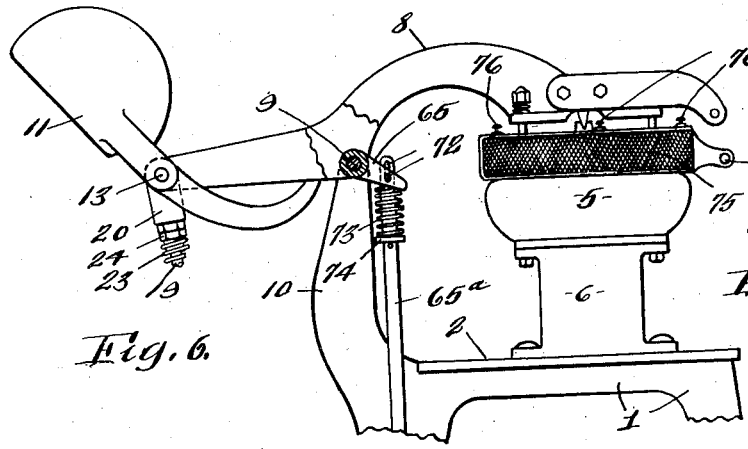
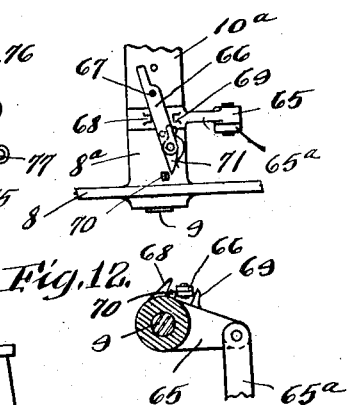
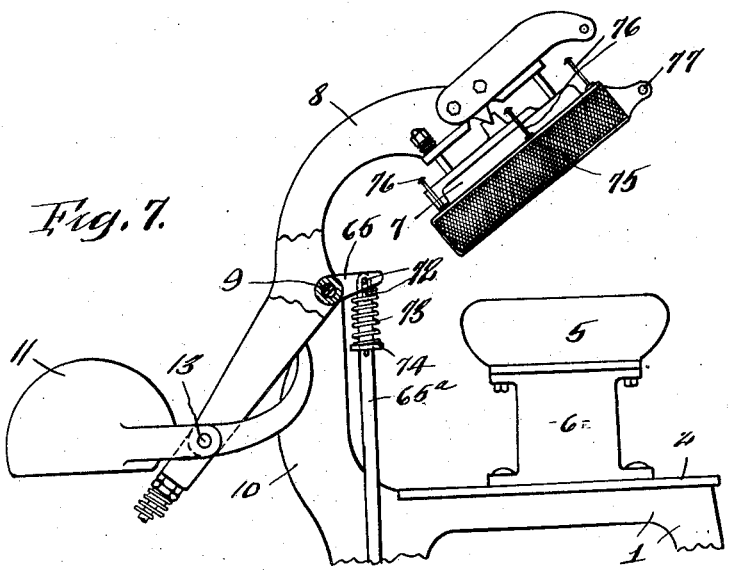
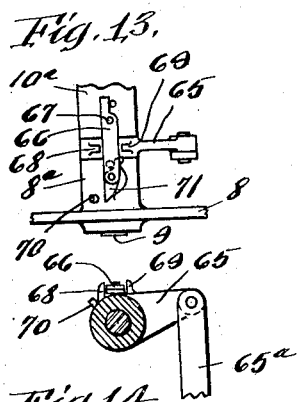

May 22, 1928.

A. B. CLISSON ET AL 1,671,064

GARMENT AND LAUNDRY PRESS

Filed Aug. 7, 1922

INVENTORS.

BY

ATTORNEYS.

Patented May 22, 1928.

1,671,064

UNITED STATES PATENT OFFICE.

ALBERT B. CLISSON, OF GEDDES, AND PHILIP N. BRAUN, OF SYRACUSE, NEW YORK, ASSIGNORS, BY MESNE ASSIGNMENTS, TO THE PROSPERITY COMPANY, INC., OF SYRACUSE, NEW YORK, A CORPORATION OF NEW YORK.

GARMENT AND LAUNDRY PRESS.

Application filed August 7, 1922. Serial No. 580,019.

This invention relates to power presses, as garment and laundry presses, and has for its object a power press in which the movable pressing member is moved into final pressing position by power actuated means and the operation of the power actuated means is controlled by the preliminary movement of the movable pressing member by the operator toward pressing position. Other objects appear throughout the specification.

The invention consists in the novel features and in the combinations and constructions hereinafter set forth and claimed.

In describing this invention, reference is had to the accompanying drawings, in which like characters designate corresponding parts in all the views.

Figure 2:
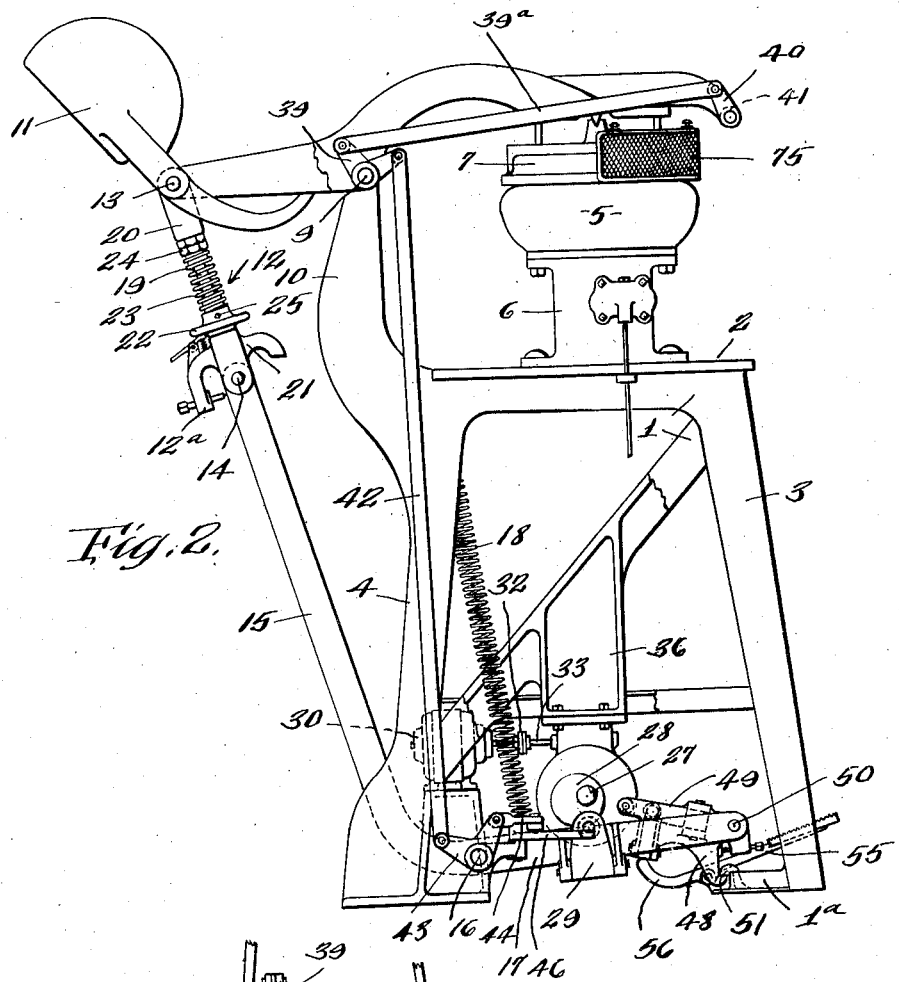
Figure 2 is a similar view showing the same in closed or pressing position.

Figure 2ª is a fragmentary detail view of the yielding toggle link.

Figure 3:
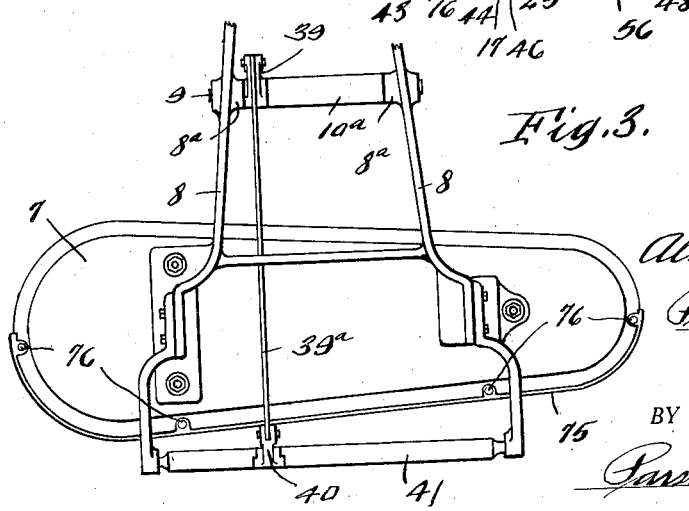

Figure 3 is a fragmentary plan view of the upper pressing member and contiguous parts.

Figure 1:
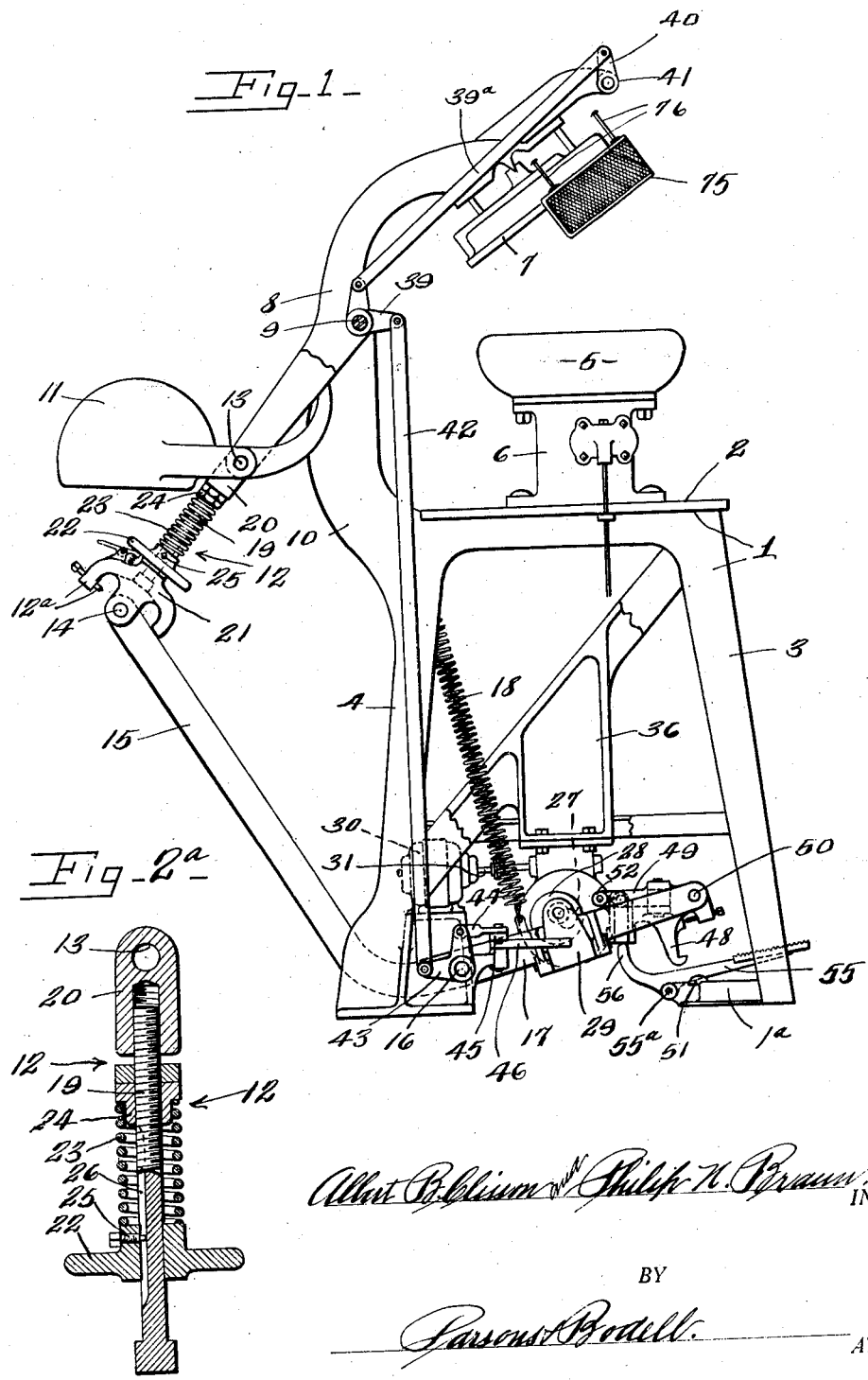
Figure 1 is an elevation of our power press, the same being shown as in open position.

Figure 4 is a transverse sectional view partly broken away, showing another form of mechanism at the lower part of Figs. 1 and 2.

Figure 5 is a detail view of a member seen in Fig. 4.

Figures 6 and 7 are fragmentary views similar to Figs. 1 and 2 showing a different form of means for controlling the closing of the press by power from that shown in Figs. 1 and 2.

Figure 8:
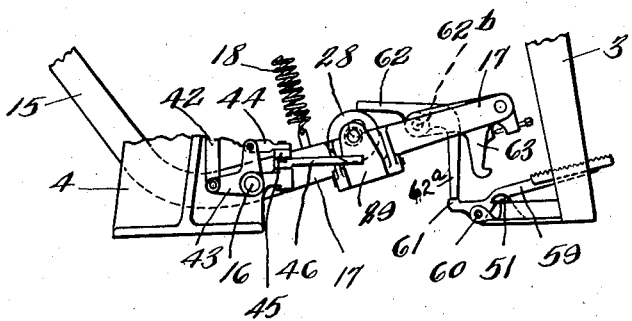
Figure 9:
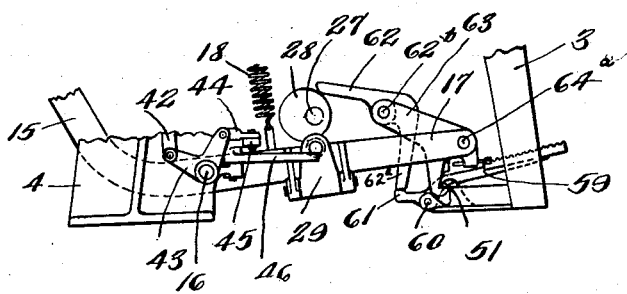

Figures 8 and 9 are fragmentary detail views illustrating the operation of one form of latch releasing mechanism, the same being shown in unlatched position in Fig. 8 and in latched position in Fig. 9.

Figure 10 is a fragmentary plan view showing the latch releasing mechanism appearing in Figs. 4 and 5.

Figures 11 and 12 are fragmentary plan views of parts seen in Fig. 10, showing the position of parts of the connection between the frame lever and the automatic follower shifting means, when the upper press head is in pressing position.

Figures 13 and 14 are views similar to Figures 11 and 12, showing the position of the parts of such mechanism when the upper pressing head is up, or in its position shown in Fig. 8.

This pressing machine comprises generally a frame, upper and lower pressing members, one of which is movable toward and from the other, the movable member being shiftable initially or preliminarily by the operator toward the lower, power means for moving the movable pressing member into final pressing relation with the lower member, and means operated by the initial or preliminary movement of the upper pressing member for controlling the application of the power to the upper pressing member. It further includes means for holding the pressing members in final pressing position and power means which are operator-controlled for releasing the holding means. It also includes a particularly simple and efficient arrangement of the guard to prevent the hands of the operator from being caught between the pressing members, which guard is arranged to come into operative position substantially at the end of the preliminary movement of the movable pressing member and at the same time that the power means are shifted into operative connection with the movable pressing member. Some of the foregoing features may, however, be omitted.

We have here shown our invention as embodied in the type of machine having a movable upper pressing member and a stationary lower member or buck and having operating mechanism of the type shown in patents to A. C. Austin. Nos. 1,252,988, Jan. 8, 1918, and 1,335,151, March 30, 1920, and in our pending application, Sr. No. 573,016, filed July 5, 1922.

1 designates the frame which includes a table 2, front and rear legs 3, 4, there being two front legs and a single rear leg arranged midway between the front legs.

5 is the lower pressing member or buck which is mounted upon a standard or gooseneck 6 which in turn is mounted upon the table 2.

7 is the upper pressing member or head which is carried by one arm of a frame lever 8 pivoted at 9 to the upper end of an upward extension 10 for the rear leg 4, the other arm of the lever being provided with a suitable counterweight 11 and also being connected to the actuating means. The actuating means is here shown as including a toggle link 12 pivoted at one end at 13 to the rear arm of the lever 8 and at its other end at 14 to the upper end of the second toggle link 15 which is pivoted at 16 to the frame or the rear leg thereof. The link 15 is formed with a forwardly extending part or lever 17 rigid therewith. This lever 17 has heretofore been provided with a pedal, but in this embodiment of our invention no actuating pedal for performing the preliminary or final pressing movements of the press head 7 is provided. A spring 18 is also provided for acting in conjunction with the counterweight 11 to open the press. The toggle link 12 is also constructed to yield as the toggle link is moved into or toward a straight line. This toggle link may be of the construction shown in the Austin patents referred to, but is here shown, Fig. 2ª as comprising a rod 19 threading at its upper end into a coupling or clevis 20 which is pivoted at 13 to the frame lever 8, the rod being endwisely slidable and also rotatable in a coupling member 21 which is pivoted at 14 to the upper end of the link 15. The link 12 further includes a hand wheel 22 for turning the rod and a spring 23 between the hand wheel and the spring abutment or nut 24 threading on the rod. The wheel 22 is keyed to the rod 19 by a key 25 which works in a lengthwise key-way 26 in the rod, this wheel thrusting against a coupling member 21. The spring 23 is located between the wheel and the nut 24. The nut 24 is for the purpose of adjusting the tension of the spring and the wheel for adjusting the effective length of the link 12. Obviously, by turning the wheel in one direction or the other, the rod 19 will thread into or out of the end member 20 and shorten or lengthen the effective length of the toggle link 12. Also as the toggle links 12 and 15 move toward a straight line and the pressing member 7 engages the work on the buck 5, the rod 19 can slide endwisely in the coupling member 21 against the compression of the spring 23. The movement of the toggle toward a straight line is limited to any suitable means as a stop arm 12ª on one link arranged to engage the other link.

The power means for actuating the movable or the upper pressing member comprises a drive shaft 27 or other rotating element carried by the frame 1, the shaft preferably being a constantly rotating shaft, and motion transmitting means between the shaft and the pressing member 7 comprising in addition to other motion transmitting parts, two elements, one of which is shiftable into and out of operative engagement or connection with the other. The additional motion transmitting means are the frame lever 8, toggle links 12 and 15 and lever 17. Such elements are preferably a cam 28 mounted on the shaft 27 and a follower 29 mounted on the lever 17, one being shiftable into and out of engagement with the other. As here shown, the follower 29 is shiftable into and out of engagement with the cam 28.

The shaft 27 is mounted in suitable bearings in the frame, as shown in Figs. 1, 2 and 4 and is usually actuated by a constantly running motor 30 mounted on the frame, the armature shaft 31 of the motor being coupled at 32 to a shaft 33 having a worm 34 thereon which meshes with the worm gear of the outer end of the shaft 27. The shaft 33 is journalled in the casing for the worm 34 which casing also carries the bearings for the shaft 27 and this casing is bolted or otherwise secured to a bracket 36 carried by the frame, between the front and rear legs thereof. The shaft 27 extends in a direction at an angle to the lever 17 and terminates near said lever, and the cam 28 runs adjacent said lever 17. The follower 29 is substantially of the same construction as that shown in our pending application referred to, and comprises a follower pin 29ª movable into and out of engagement with the periphery of the cam 28 and carried by a rock arm mounted on a shaft 37 suitably carried by the lever 17 and being normally held out of the path of the cam by a spring 38 interposed between said arm and the lever 17.

The means for shifting the follower 29 into the path of the cam 28 is operated during the preliminary movement of the upper pressing head 7 or the frame lever 8 downwardly, which movement is effected by the operator; and as shown in Figures 1 and 2, this means comprises a part 39 mounted concentric with the axis 9 of the frame lever 8, this part 39 being a bell crank, one arm of which is connected by the link 39ª, to a rock arm 40 mounted on the handle 41 of the frame lever or the pressing member 7, and the other arm of which is connected by a link 42 to one arm of a second bell crank 43 pivoted to the frame concentric with the axis 16 of the toggle link 15, the other arm of the second bell crank lever 43 being connected by a link 44, Fig. 4, to one arm of a third angle lever 45, the other arm 46 of which presses against the follower 29 and tends to move this arm 29 on its pivot 37 and move the follower pin into the path of the cam 28. The handle 41 is similar to that which has been provided on garment pressing machines but it has a rocking movement by means of which the arm 40 may be rocked to shift the follower 29.

The shifting of the follower 29 by the handle 41 is prevented until the pressing member 7 has been moved downwardly a predetermined distance by the suitable means, and as here illustrated, the follower pin is opposed to the end face of the cam 28 and presses against said face until the lever 17 has been depressed far enough to permit the follower to move under the low point of the cam 28.

The operation, as thus far described, is as follows:—

The operator takes hold of the handle 41 and pulls the pressing member 7 downwardly toward the lower buck 5, at the same time, turning or rocking the handle 41 anticlockwise. Such rocking shifts the follower 29 through the part 39, but the shifting is delayed until the upper pressing member, and hence the lever 17, has been moved far enough downwardly to shift the follower pin 29$^a$ under the cam 28. As soon as this occurs, the cam depresses the lever 17 and hence moves the pressing member 7 to final pressing position.

The member 7 is held in its final pressing position by holding means which are releasable by the power or the drive shaft 27, but which is operator-controlled.

The holding means, as here shown comprises a hook or latch 48 carried by a lever 49 which is pivoted at 50 to the front end of the lever 17, this latch coacting with a shoulder or keeper 51 on the frame. The weight of the latch 48 and the lever 49 is such that the latch moves automatically into engagement with the keeper 51 during the depression of the lever 17 and the shape of the hook of the latch is such that it ratchets into engagement with the keeper 51.

The power-actuated operator-controlled means for releasing the latch comprises a follower arranged to be shifted into and out of operative engagement with the cam 28, or, if necessary, another cam on the shaft 27.

As illustrated, in Figs. 1, 2, 4 and 5, 52 is a follower carried by the lever 53 pivoted at 54 to the lever 49 which carries the latch 48. Normally this lever 53 is located laterally out of the path of the cam 28, and is shifted into such path by an operating member as a pedal lever 55 pivoted at 55$^a$ to a horizontal brace 1$^a$ between the lower ends of the front legs 3 of the frame 1 and having an arm 56 arranged under one arm of an angle lever 57 and its other arm thrusting against the lever 53 which carries the follower 52. The angle lever is pivoted at 57$^a$ to the lever 49, which is pivoted to the main lever 17, and which carries the latch or hook 48. The follower lever 53 is held in its normal position and returned to its normal position by a spring 58, Figs. 4 and 5. The follower is held engaged with the cam 28 by the friction between the follower and high point of the cam. When the low point of the cam comes opposite the follower, the friction is relieved so that the spring 58 can act.

Another form of latch releasing means is shown in Figs. 8, 9 and 10, comprising a pedal lever 59 pivoted at 60 to the frame beneath and at one side of the lever 17 and having a fulcrum point 61 arranged to come under a depending arm 62$^a$ of a follower lever 62. The lever 62 is pivoted at 62$^b$ to an arm of the latch or hook 63 which is pivoted at 64 to the lever 17. When pressure is applied to the pedal 59, obviously, the lever 62 will be held from movement on its pivot 62$^b$ and the follower lever 62 riding on the cam 28 will cause the lever 62 and the latch 63 to move as a unit about the pivot 64 of the lever 62 and hence move the latch 63 out of engagement with the keeper 51.

As seen in Figs. 6, 7, 11, 12, 13 and 14, the follower 29 instead of being operated by a handle 41 on the upper pressing head, may be operated directly and automatically by the frame lever 8. In these figures, the operating means for the follower 29 is shown as connected to the frame lever by a lost motion connection, whereby during the preliminary movement of the frame lever downwardly, no motion is transmitted to the follower 29, but after the frame lever has been moved a predetermined distance the lost motion is taken up and the follower 29 shifted into engagement with the cam 28 so that the final pressure and latching operation is effected by the cam.

As seen in Figs. 6, 7, and 11 to 14, inclusive, a rock arm or part 65 is mounted on the pivot 9 on which the frame lever is mounted, this pivot being a non-rotatable shaft fixed in the bearing 10$^a$ at the upper end of the extension 10 of the rear leg 4, the frame lever having a hub 8$^a$ mounted on each end of this shaft 9; the part 65 has a hub mounted on the shaft 9 between one of these hubs 8$^a$ and one end of the bearing 10$^a$.

The frame lever is clutched at the proper time to the bearing 10$^a$ by suitable clutch connection, that here illustrated comprising a lever 66 pivoted at 67 to the stationary bearing 10$^a$ of the extension 10 and extending between a pair of spaced shoulders 68, 69, projecting from the hub of the part or rock arm 65, this lever having its end remote from its pivot 67 located in the path of a shoulder or pin 70 on the hub 8$^a$ of the frame lever 8. During the initial downward movement of the frame lever 8 by reason of it being pulled down by the operator, the shoulder 70 engages the lever 66 and moves it on its pivot 67 until the lever 66 takes up the lost motion between it and the shoulder 69 and engages such shoulder so that continued movement of the pressing head 7 downwardly rocks the arm 65 and hence through connections, as the link 65$^a$ and bell crank mechanism similar to the members 43, 44, 45 and 46, previously described shifts the follower 29 into the path of the cam 28.

As soon as the latch 48 engages the keeper 51 the follower 29 is moved out of its operative position by the action of the spring 38 and hence, the member 65 is again rocked upwardly returning it and the lever 66 to its starting position. When the upper pressing head is subsequently released, as before described, so that the frame lever and parts operated thereby, are moved to their upper position by the counterweight 11 and counter spring 18, the shoulder 70 passes from the front to the rear side of the engaging end of the lever 66, this being permitted by the fact that the engaging end of such lever is a spring-pressed ratchet 71 capable of movement in one direction only, that is, it is hinged to the lever 66 by a stop joint. The arrangement of this ratchet 71 relative to the shoulder 70 is such that when the lever or member 66 has been moved to its extreme shifted position, the end of this ratchet moves out of the path of the pin 70, permitting the pin to pass by the ratchet 71, to the front side thereof, when the frame lever is being moved by power into final pressing position.

In order that the movement of the arm 65 may take place at the proper time, and further in order that a transference of such movement to the follower 29 may be delayed when the follower encounters the end face of the cam 29, the part 65 is yieldingly connected to the link 65ª, which it operates, it being here shown as connected thereto by a pin and slot connection at 72 and by a spring 73 interposed between the arm 65 and the shoulder 74 of the link 65ª. When the follower pin 29 encounters the end face of the cam 28, the arm 65 compresses the spring 73 and as soon as the follower pin comes under low point of the cam 28, the spring 73 expands and throws the follower under the cam 28. The spring 73 is slightly stronger than the spring 38 which tends to force the follower out of engagement with the cam 28.

We have here shown the upper pressing head 7 as provided with a guard 75 projecting in advance thereof toward the lower pressing member 5, this guard being arranged to encounter the lower buck 5 or the work thereon, at about the same time that the follower 29 operatively engages the cam 28, the guard being connected to the pressing head to permit the pressing head to move onto the work after the guard has been stopped in its movement by reason of its engagement with the lower buck, or the work thereon. As here shown, the guard is slidably mounted on guide pins 76 projecting upwardly from the margin of the upper pressing head 7. This guard prevents the operator from getting his hands caught between the pressing elements, especially when the power is being applied. However, in most instances, such guard is unnecessary, (unless to conform to factory laws in some States).

In Figs. 6 and 7, the guard is shown as formed with a handle 77 which can be taken hold of to effect the preliminary movement of the lower pressing head, and at the same time, pull the guard downwardly to engage the lower buck when the upper press head has been moved through this preliminary or initial movement.

This machine is particularly advantageous in that it is power actuated and has no pedals other than a trip pedal, and further in that it is impossible for an operator's hands to become caught in the pressing members even when no guard is provided as the power can not be applied until the press is preliminarily closed and the head cannot be brought down far enough during the preliminary closing for the follower to move under the cam if the head is obstructed by the hand of the operator.

What we claim is:

1. In a pressing machine, a frame, pressing members having relative movement one toward and from the other and means for actuating the movable member comprising a drive shaft, motion transmitting means between the drive shaft and the movable member including two elements one shiftable into and out of engagement with the other, the movable member being provided with a handle and means for shifting the shiftable element into engagement with the other element when the movable pressing member has been moved by the handle toward the other pressing member a predetermined distance, and means for preventing the shifting of the shiftable element until it has reached such predetermined position, substantially as and for the purpose specified.

2. In a pressing machine, a frame, upper and lower pressing members, the upper pressing member being movable toward and from the lower member, and means actuating the upper pressing member comprising a drive shaft and motion transmitting means between said shaft and the upper pressing member including two elements, one shiftable into and out of engagement with the other, the upper pressing member having a handle by which it is preliminarily moved toward the lower pressing member and means, said handle having a movement relatively to the upper pressing member, and connections between the handle and the shiftable motion transmitting element to shift said element into engagement with the other element, said connections being actuated by said relative movement of the handle.

3. In a pressing machine, a frame, upper and lower pressing members, the upper pressing member being movable toward and from the lower member, and means for actuating the upper pressing member comprising a drive shaft and motion transmitting means between said shaft and the upper pressing member including two elements, one shiftable into and out of engagement with the other, the upper pressing member having a handle by which it is preliminarily moved toward the lower pressing member, means operable by the handle to shift the shiftable element into engagement with the other element and means for preventing such shifting until the pressing element has been preliminarily moved by the handle a predetermined distance, substantially as and for the purpose described.

4. In a pressing machine, a frame, upper and lower pressing members, the upper pressing member being movable toward and from the lower member, the latter being mounted on the frame, means for actuating the upper pressing member comprising a drive shaft, and motion transmitting means between the drive shaft and the upper pressing member comprising a lever, a cam element mounted on the shaft, a follower element carried by the lever, one of said elements being shiftable into and out of engagement with the other and means for shifting the shiftable element comprising a part movable with the upper pressing member and also relatively thereto, and connections between said part and the shiftable element to transfer the relative movement of said part to the shiftable element.

5. In a pressing machine, a frame, upper and lower pressing members, the upper pressing member being movable toward and from the lower member, the latter being mounted on the frame, means for actuating the upper pressing member comprising a drive shaft, and motion transmitting means between the drive shaft and the upper pressing part comprising a lever, a cam element mounted on the shaft, a follower element carried by the lever, one of said elements being shiftable into and out of engagement with the other, means for shifting the shiftable element comprising a manually operated part movable with the upper pressing member and also having a movement relatively thereto, motion transmitting means between said part and the shiftable element to transfer the relative movement of said part to the shiftable element to shift it and means for preventing the movement of the shiftable element by said part, until the upper pressing member has moved a predetermined distance toward the lower pressing member, substantially as and for the purpose described.

6. In a pressing machine, a frame, upper and lower pressing members, the upper pressing member being movable toward and from the lower, and the lower being mounted on the frame, a frame lever pivoted to the frame and carrying the upper pressing member, means for actuating the frame lever comprising a power actuated drive shaft, and motion transmitting means between the shaft and the frame lever comprising two elements, one of which is shiftable into and out of engagement with the other, and means for shifting the shiftable element including a part mounted concentric with the frame lever pivot, and means for operating said part, one of said elements having a face arranged in the path of the shiftable element until the frame lever has been lowered a predetermined distance, and motion transmitting connections between said part and the shiftable motion transmitting element substantially as and for the purpose specified.

7. In a pressing machine, a frame, upper and lower pressing members, the upper pressing member being movable toward and from the lower, and the lower being mounted on the frame, a frame lever pivoted to the frame and carrying the upper pressing member, means for actuating the frame lever comprising a power actuated drive shaft, and motion transmitting means between the shaft and the frame lever comprising two elements, one of which is shiftable into and out of engagement with the other and means for shifting the shiftable element including a part mounted concentric with the frame lever pivot, and means for operating said part, and means for preventing the shifting of said element until the frame lever has been lowered a predetermined distance, and motion transmitting connections between said part and the shiftable motion transmitting element substantially as and for the purpose set forth.

8. In a pressing machine, a frame, pressing members having relative movement one toward and from the other, means for actuating the movable member to apply final pressure comprising a drive shaft, motion transmitting means between the drive shaft and the movable member including two elements, one of which is shiftable into and out of engagement with the other and means for shifting the shiftable element into engagement with the other element when the movable pressing member has been shifted a predetermined distance toward the other member, power operated releasing means for permitting the movable pressing member to move in the reverse direction to open the press and operator-actuated means for controlling the operation of the releasing means, substantially as and for the purpose set forth.

9. In a pressing machine, a frame, pressing members having relative movement one toward and from the other, means for actuating the movable member comprising a drive shaft, motion transmitting means between the drive shaft and the movable member including two elements, one of which is shiftable into and out of engagement with the other, operator-actuated means for initially or preliminarily moving the movable pressing member toward the other pressing member and shifting the shiftable element into engagement with the other element before the movable pressing member reaches final pressing position, a latch for holding the pressing member in final pressing position and operator-controlled power means shiftable into operative connection with the drive shaft for releasing the latch, substantially as and for the purpose described.

10. In a pressing machine, a frame, pressing members having preliminary relative movement one toward and from the other, means for actuating the movable member to apply final pressure comprising a drive shaft, motion transmitting means between the drive shaft and the movable member including a part located near the shaft, a cam element mounted on the shaft and a follower element on said part, means for shifting one element into engagement with the other at the end of the preliminary movement of the movable pressing member toward pressing position, and a latch for holding said part in its position assumed when the pressing members are in final pressing position, a follower associated with the latch and operator-controlled means for shifting the last-mentioned element into operative engagement with the cam element, whereby the latch is released, substantially as and for the purpose set forth.

11. In a pressing machine, a frame, upper and lower pressing members, the upper pressing member being movable toward and from the lower and the lower member being mounted on the frame, a lever pivoted to the frame and supporting the upper pressing member, a handle for moving the lever and the pressing member carried thereby preliminarily downwardly, the handle also having a movement relatively to the lever and the movable pressing element, power actuated means for actuating the lever and the pressing member carried thereby after the same has been moved a predetermined distance downwardly by the handle, the power actuated means including a shiftable element, a part connected to the handle to be actuated by the movement of the handle relatively to the lever and the movable pressing member, a second part mounted concentric with the pivot of the lever, motion transmitting connections between said parts and motion transmitting connections between the part mounted concentric with the pivot of the lever and said shiftable element, whereby said shiftable element is shifted by the relative movement of the handle.

In testimony whereof, we have hereunto signed our names at Syracuse, in the county of Onondaga, and State of New York, this 13th day of July, 1922.

ALBERT B. CLISSON
PHILIP N. BRAUN.